United States Patent
Chu et al.

(10) Patent No.: US 10,276,108 B2
(45) Date of Patent: Apr. 30, 2019

(54) METHODS FOR ADJUSTING BACKLIGHT BRIGHTNESS LEVELS, RELATED BACKLIGHT ADJUSTING DEVICE, AND RELATED DISPLAY DEVICE

(71) Applicant: BOE TECHNOLOGY GROUP CO., LTD, Beijing (CN)

(72) Inventors: Yifang Chu, Beijing (CN); Chengqi Zhou, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 95 days.

(21) Appl. No.: 15/509,120

(22) PCT Filed: Sep. 22, 2016

(86) PCT No.: PCT/CN2016/099699
§ 371 (c)(1),
(2) Date: Mar. 6, 2017

(87) PCT Pub. No.: WO2017/148136
PCT Pub. Date: Sep. 8, 2017

(65) Prior Publication Data
US 2018/0233093 A1 Aug. 16, 2018

(30) Foreign Application Priority Data
Mar. 2, 2016 (CN) .......................... 2016 1 0118570

(51) Int. Cl.
G09G 3/34 (2006.01)
G09G 3/36 (2006.01)
(52) U.S. Cl.
CPC ......... *G09G 3/3426* (2013.01); *G09G 3/3406* (2013.01); *G09G 3/36* (2013.01); *G09G 2320/0626* (2013.01); *G09G 2360/16* (2013.01)

(58) Field of Classification Search
CPC ...... G09G 3/3426; G09G 3/3406; G09G 3/36; G09G 2320/0626; G09G 2360/16
See application file for complete search history.

(56) References Cited

U.S. PATENT DOCUMENTS

2008/0297463 A1  12/2008  Tsuru et al.
2015/0255025 A1   9/2015  Chen et al.
(Continued)

FOREIGN PATENT DOCUMENTS

CN  1808559 A   7/2006
CN  101206837 A  6/2008
(Continued)

OTHER PUBLICATIONS

The World Intellectual Property Organization (WIPO) International Search Report and Written Opinion for PCT/CN2016/099699 dated Dec. 21, 2016 14 Pages.

(Continued)

*Primary Examiner* — Peter D McLoone
(74) *Attorney, Agent, or Firm* — Anova Law Group, PLLC

(57) ABSTRACT

The present application provides a method for adjusting backlight brightness levels of a display. A display region of the display is divided into a plurality of sub-display regions. Each sub-display region displays a sub-image region of a to-be-displayed image. A backlight brightness level of a sub-display region is adjustable. The method including: determining if white-image areas in a sub-image region satisfies a preset condition; and increasing the backlight brightness level of a sub-display region corresponding to the sub-image region if the white-image areas satisfy the preset condition.

25 Claims, 7 Drawing Sheets

(56) References Cited

U.S. PATENT DOCUMENTS

2015/0348471 A1* 12/2015 Meng .................. G09G 3/3426
345/691
2016/0322006 A1 11/2016 Chen

FOREIGN PATENT DOCUMENTS

| | | | |
|---|---|---|---|
| CN | 101231832 | A | 7/2008 |
| CN | 101350170 | A | 1/2009 |
| CN | 101354875 | A | 1/2009 |
| CN | 101651806 | A | 2/2010 |
| CN | 102708810 | A | 10/2012 |
| CN | 103680423 | A | 3/2014 |
| CN | 104050934 | A | 9/2014 |
| CN | 104332140 | A | 2/2015 |
| CN | 104658487 | A | 5/2015 |
| CN | 104766569 | A | 7/2015 |
| CN | 105513546 | A | 4/2016 |
| JP | 4527202 | B2 | 8/2010 |

OTHER PUBLICATIONS

State Intellectual Property Office of the P.R.C (SIPO) Office Action 1 for 201610118570.X dated Aug. 28, 2017 15 Pages (including translation).

* cited by examiner

METHODS FOR ADJUSTING BACKLIGHT BRIGHTNESS LEVELS, RELATED BACKLIGHT ADJUSTING DEVICE, AND RELATED DISPLAY DEVICE

CROSS-REFERENCE TO RELATED APPLICATION

This application is a national phase entry under 35 U.S.C. § 371 of International Application No. PCT/CN2016/099699, filed on Sep. 22, 2016, which claims priority to Chinese Patent Application No. 201610118570.X, filed on Mar. 2, 2016. The above enumerated patent applications are incorporated by reference herein in their entirety.

TECHNICAL FIELD

The present invention relates to display technology, more particularly, to a method for adjusting backlight brightness levels, related backlight adjusting device, and related display device.

BACKGROUND

Liquid crystal displays (LCDs) are often light and thin, and are energy-efficient. LCDs have been widely used in modern display and communication devices. To reduce the overall energy consumption and improve contrast levels of LCDs, backlight adjustment technology has been applied in the display technology of LCDs. However, conventional backlight adjustment methods often impair the contrast level of the image displayed and the display effect of the LCD.

SUMMARY

An aspect of the present disclosure provides a method for adjusting backlight brightness levels of a display. A display region of the display is divided into a plurality of sub-display regions. Each sub-display region displays a sub-image region of a to-be-displayed image. A backlight brightness level of a sub-display region is adjustable. The method including: determining if white-image areas in a sub-image region satisfies a preset condition; and increasing the backlight brightness level of a sub-display region corresponding to the sub-image region if the white-image areas satisfy the preset condition.

Optionally, determining if white-image areas in a sub-image region satisfy a preset condition includes: selecting a pixel according to a preset sequence; calculating a brightness value of the pixel; and determining if the brightness value of the pixel is higher than a first preset brightness value. The method further includes: determining if an inquiry information for the pixel is stored in a target storage, the inquiry information for the pixel comprising coordinates data of the pixel; if the brightness value of the pixel is higher than the first preset brightness value and the inquiry information of the pixel is not stored in the target storage, labeling the pixel as a center pixel and storing the inquiry information of the pixel into the target storage; sequentially inquiring neighboring pixels of the center pixel; and calculating brightness values of the neighboring pixels. The method further includes: selecting the neighboring pixels with the brightness values higher than the first preset brightness value, labeling the neighboring pixels with the brightness values higher than the first preset brightness value as candidate pixels, and storing inquiry information of the candidate pixels in the target storage; and determining a number of pixels stored in the target storage.

Optionally, the method further includes: determining the white-image area in the sub-image region meets the preset condition if the number of pixels stored in the target storage reaches a threshold number.

Optionally, the method further includes determining whether candidate pixels are stored in the target storage if the number of pixels is fewer than the threshold number.

Optionally, the method further includes: if candidate pixels are stored in the target storage, selecting one pixel from the candidate pixels as the center pixel, and removing a label of the selected pixel as a candidate pixel.

Optionally, the method further includes: determining if each pixel in the sub-display region has been inquired if no candidate pixels are stored in the target storage.

Optionally, the method further includes: determining the white-image area in the sub-image region fails to meet the preset condition if each pixel in the sub-display region has been inquired; and returning to calculating a brightness value of a pixel in a sub-display region according to the preset sequence if not all pixels in the sub-display region have been inquired.

Optionally, the method further includes determining if an interfering pixel exists between candidate pixels after labeling the neighboring pixels with the brightness values higher than the first preset brightness value as candidate pixels.

Optionally, coordinate data of the interfering pixel is stored in a same address with a corresponding candidate pixel in the target storage, and coordinate data of the center pixel is stored in an address of each candidate pixel in the target storage.

Optionally, the neighboring pixels being adjacent to and being above, below, on the left side, and on the right side of the center pixel, and determining the interfering pixel includes: based on the coordinate data of candidate pixels and corresponding center pixel, determining locations of the candidate pixels with respect to the center pixel.

Optionally, for two candidate pixels, if one candidate pixel is located above the center pixel and another candidate pixel is located on the left side of the center pixel, an interfering pixel exists between the two candidate pixels, an X coordinate of the interfering pixel being a smaller one of X coordinates of the two candidate pixels, and a Y coordinate of the interfering pixel being a smaller one of Y coordinates of the two candidate pixels; if one candidate pixel is located above the center pixel and the other candidate pixel is located on the right side of the center pixel, an interfering pixel exists between the two candidate pixels, the X coordinate of the interfering pixel being the smaller one of the X coordinates of the two candidate pixels, and the Y coordinate of the interfering pixel being a greater one of the Y coordinates of the two candidate pixels; if one candidate pixel is located below the center pixel and the other candidate pixel is located on the left side of the center pixel, an interfering pixel exists between the two candidate pixels, the X coordinate of the interfering pixel being a greater one of the X coordinates of the two candidate pixels, and the Y coordinate of the interfering pixel being the smaller one of the Y coordinates of the two candidate pixels; and if one candidate pixel is located below the center pixel and the other candidate pixel is located on the right side of the center pixel, an interfering pixel exists between the two candidate pixels, the X coordinate of the interfering pixel being the greater one of the X coordinates of the two candidate pixels, and the Y coordinate being the greater one of the Y coordinates of the two candidate pixels.

Optionally, the method further includes: calculating an average brightness level of the sub-image region; and determining if the average brightness level falls in a preset brightness level range.

Optionally, the method further includes: determining if white-image areas in a sub-image region satisfy the preset condition if the average brightness level falls in the preset brightness level range; and increasing the backlight brightness level of a sub-display region corresponding to the sub-image region if the white-image areas satisfy the preset condition.

Optionally, the method further includes: adjusting the backlight brightness level of the sub-display region based on the average brightness level of the sub-display region if the average brightness level falls out of the preset brightness level range.

Optionally, the preset brightness level range is between a first brightness value and a second brightness value, the first brightness value being approximately between 0.4 and 0.5, and the second brightness value being approximately between 0.1 and 0.2.

Optionally, if inquiry information of the pixel is stored in the target storage, the display returns to selecting each pixel according to the preset sequence.

Optionally, the method further includes: adjusting the backlight brightness level of the sub-display region based on the average brightness level of the sub-display region if the white-image areas in the sub-display region fails to satisfy the preset condition.

Optionally, the preset sequence is based on an order pixel data is entered for computation.

Optionally, the preset condition is a plurality of white-image areas continuously arranged in a sub-image region.

Another aspect of the present disclosure provides a backlight adjusting device, including a determining unit and a backlight adjusting unit. The determining unit is configured to determine if white-image areas in a sub-image region satisfy a preset condition. The backlight adjusting unit is configured to increase a backlight brightness level of the sub-display region if the white-image areas in the sub-display region satisfies the preset condition.

Optionally, the determining unit further includes: a first computing module configured to calculate a brightness value of each pixel in a sub-display region according to a preset sequence and compare the brightness value of each pixel to a first preset brightness value; a first determining module configured to determine if the brightness value of a pixel is higher than the first preset brightness value and if inquiry information of the pixel is stored in the target storage, the inquiry information comprising coordinate data of the pixel; and an inquiring module configured to sequentially inquire neighboring pixels of a center pixel. The determining unit further includes: a selecting module configured to calculate brightness values of the neighboring pixels, select pixels with brightness values higher than the first preset brightness value, and label the selected pixels as candidate pixels; a counting module configured to count a number of pixels stored in the target storage; and a second determining unit configured to determine if the number of pixels stored in the target storage reaches a threshold number. The determining unit further includes: a third determining module configured to determine if candidate pixels are stored in the target storage when the number of pixels stored in the target storage is less than the threshold value; a decision-making module configured to select one of the candidate pixels as a center pixel when the candidate pixels are stored in the target storage; and a fourth determining module configured to continue to determine if the first computing module has inquired each pixel in the sub-display region when the no candidate pixels are stored in the target storage. The determining unit further includes: a labeling module configured to label a pixel as a center pixel when the brightness value of the pixel is higher than the first preset brightness value and the inquiry information of the pixel is not stored in the target storage, and remove the label of being a candidate pixel from the pixel selected by the selecting module; a storage module configured to store inquiry information of a center pixel and store the inquiry information of the candidate pixels; and a terminating module configured to terminate a determining operation for the sub-display region when the number of pixels stored in the target storage reaches the threshold number, return a message indicating the white-image areas in the sub-image region fails to satisfy the preset condition when each pixel in the sub-display region has been inquired, and terminate a determining operation on the sub-display region.

Optionally, the determining unit further includes a fifth determining module configured to determine if an interfering pixel exists between two candidate pixels.

Optionally, the fifth determining module includes: a location-determining sub-module configured to determine a location of each candidate pixel with respect to a corresponding center pixel based on the coordinate data of the candidate pixel and the center pixel; and an interfering-pixel coordinate-determining sub-module configured to determine if an interfering pixel exists and coordinate data of the interfering pixel.

Optionally, the backlight adjusting unit is configured to adjust the backlight brightness level of the sub-display region if the white-image areas in the sub-display region fails to satisfy the preset condition.

Optionally, the preset condition is a plurality of white-image areas continuously arranged in a sub-image region.

Another aspect of the present disclosure provides a display device, including one or more of the disclosed backlight adjusting devices.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

A common way to adjust the backlight of a display, e.g., an LCD, can be described using the following algorithm. For illustrative purposes, the embodiments of the present disclosure are described using an LCD as an example. First, the backlight light-emitting diodes (LEDs) are divided into a plurality of sub-display regions. The backlight LEDs refer to the LEDs used for providing the backlight for the LCD. Accordingly, the image displayed by the LCD is divided into a plurality of sub-image regions, each sub-image region being a portion of the image. Each sub-display region displays a portion of the image and each sub-image region corresponds to a sub-display region. Based on the brightness level of the pixels included in each sub-image region, the backlight brightness level required for each sub-display region when displaying an image can be calculated or determined. By individually controlling or adjusting the average backlight brightness level for each sub-image region, the power consumption of the LCD can be reduced, and the contrast level of the LCD can be improved. However, in this example, if the image contains continuously arranged small white-image areas, the use of the conventional method, based on controlling the average backlight brightness level for each sub-image region, can cause the backlight brightness of the LCD to be undesirably dark. The contrast level of the image displayed and the display effect of the LCD can be impaired.

The present disclosure provides a touch electrode structure that at least partially overcomes the disadvantages of the conventional touch electrode structure. In some embodiments, The present disclosure provides a method for adjusting backlight brightness levels.

Figure 2:
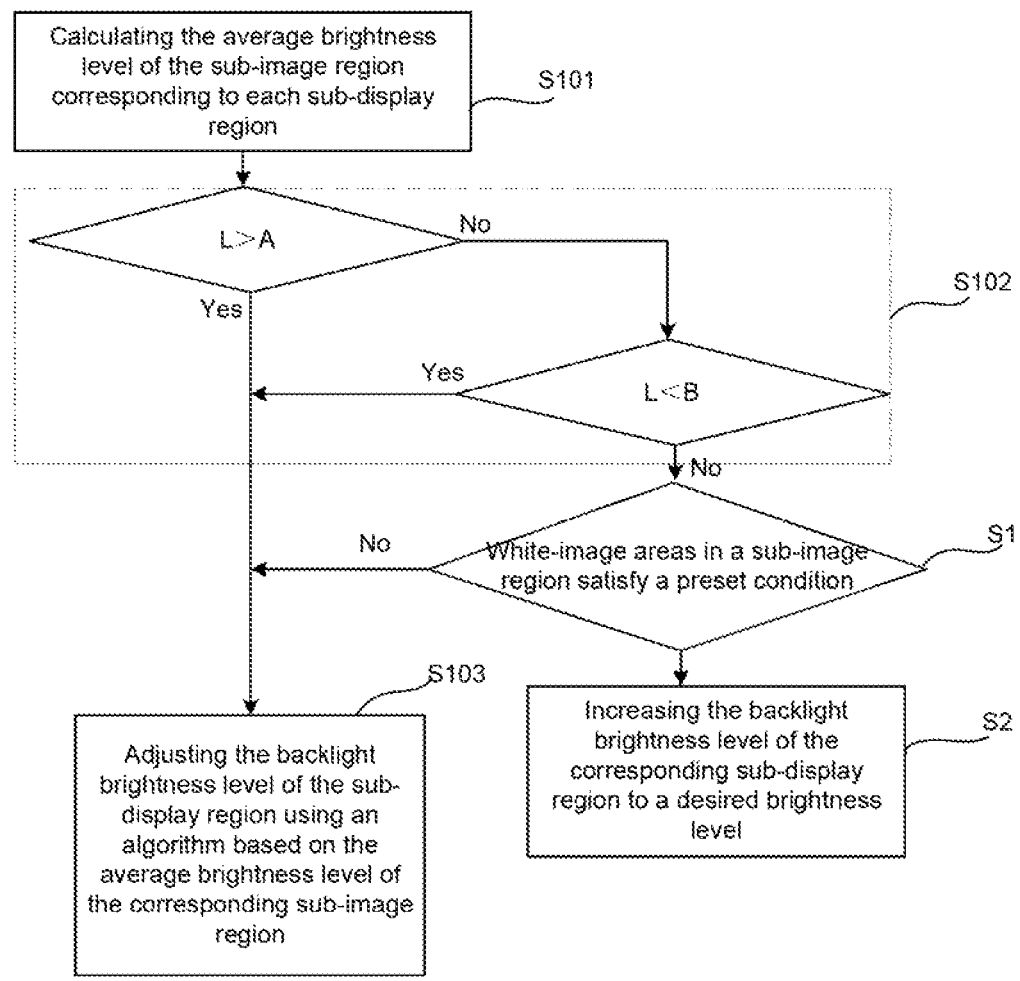
FIG. 2 illustrates an exemplary method for adjusting backlight brightness levels according to various disclosed embodiments of the present disclosure of the present disclosure.

As shown in FIG. 2, in step S1, the LCD may determine if the white-image areas, in a sub-image region of a to-be-displayed image, satisfy a preset condition. The sub-image region may correspond to a sub-display region. The backlight brightness level of the sub-display region may be adjustable.

In step S2, if the LCD determines the white-image areas satisfy the preset condition, the LCD may increase the backlight brightness level of the corresponding sub-display region to a desired value.

According to the conventional method, when the to-be-displayed image includes a large dark-image area and a plurality of small white-image areas, the backlight brightness level of the LCD may be adjusted based on the average brightness level of each sub-image region. However, because the average brightness levels of a sub-image region can be too low to trigger the condition for increasing the backlight brightness level. As a result, the backlight brightness level of the LCD can be undesirably low and the LCD may appear dark. The contrast level of the image and the display effect of the LCD can be impaired.

Figure 1:
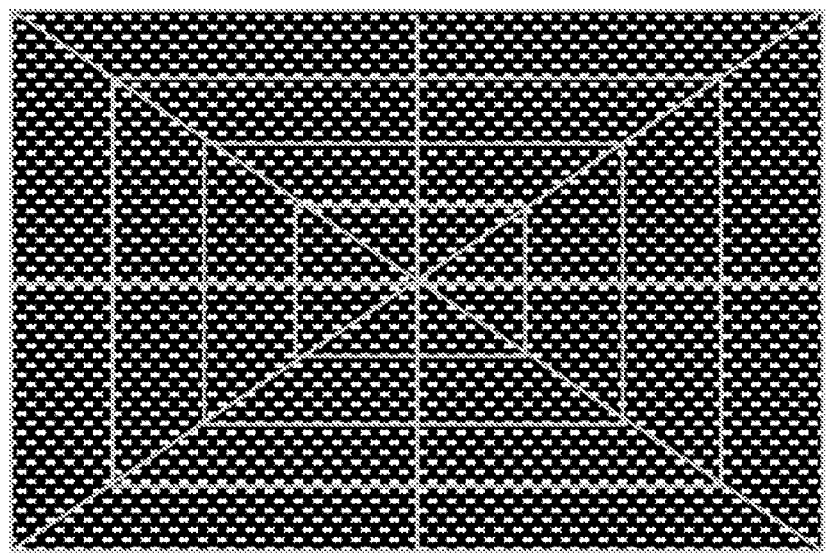
FIG. 1 illustrates an exemplary image displayed by an LCD according to various disclosed embodiments of the present disclosure.

To solve the issues described above, in the embodiments of the present disclosure, the display region of an LCD may be divided into a plurality of sub-display regions, as shown in FIG. 1. The backlight brightness of each sub-display region may be adjustable. The backlight brightness level of each sub-display region may be adjusted using a suitable method. When a sub-display region contains a large dark-image area and a plurality of small white-image areas, the LCD may directly increase the backlight brightness level of the sub-display region.

In the present disclosure, for illustrative purposes, the portion of the image displayed by a sub-display region may be referred as a sub-image region. That is, the sub-image region may be displayed by the pixels in the corresponding sub-display region. The LCD may perform suitable calculation for a to-be-displayed image and determine if brightness levels of sub-image regions in the image are too low. The adjustment to the backlight brightness level of a sub-display region, which corresponds to a sub-image region with overly low brightness level, may be determined before the image is displayed. The calculation of the average brightness level of a sub-image region may be based on the to-be-displayed image and suitable pixel data stored in the LCD.

Thus, the description of step S1 "if the white-image areas, in a sub-image region of a to-be-displayed image and correspond to a sub-display region, satisfy a preset condition" may refer to that a sub-display region, corresponding to a sub-image region of a to-be-displayed image, includes continuously arranged white-image areas, and the average brightness level of the sub-image region is not sufficient to trigger the condition for backlight brightness adjustment. In operation, the number of luminous points and/or the total area of the white-image areas may be obtained. Specifically, the LCD may calculate the number of pixels in the sub-display region with the brightness levels higher than a preset brightness value. If the number of pixels, with the brightness levels higher than the preset brightness value, is greater than a threshold number, the LCD may determine a sub-image region contains continuously arranged white-image areas and the average brightness level of the sub-image region may not be able to trigger the condition for adjusting the backlight brightness level. Thus, the LCD may increase the backlight brightness level of the sub-display region until a desired contrast level and a desired display effect are obtained. For example, the LCD may increase the backlight brightness level of the sub-display region to the highest or maximum brightness level.

The disclosed method for adjusting the backlight brightness level in an LCD may improve the contrast level of the image displayed by the LCD and the display effect of the LCD. When the image to be displayed by the LCD has large dark-image areas and small white-image areas, the disclosed method may be used to solve issues such as impaired display effect caused by overly low backlight brightness level.

It should be noted that, the disclosed method may also include other suitable methods to adjust the backlight brightness level of the LCD. For example, as shown in FIG. 2, the disclosed method may also include steps 101-103 in addition to steps S1 and S2.

In step S101, the LCD may calculate the average brightness level of the sub-image region corresponding to each sub-display region. A sub-image region may be a portion of the to-be-displayed image by the LCD. In step S101, the average brightness level L of a sub-image region may be calculated based on suitable pixel data. For example, suitable red/green/blue brightness data of each pixel contained in the sub-display region corresponding to the sub-image region may be calculated to determine the average brightness level of the sub-image region.

In step S102, the LCD may determine if the average brightness level of a sub-image region reaches a preset brightness threshold value A. If the average brightness value L of a sub-image region falls in a preset brightness level range, the LCD may proceed to execute steps S1 and S2 and may adjust the backlight brightness level of the sub-display region corresponding to the sub-image region. If the average brightness value L of a sub-image region is not in the preset brightness level range, the LCD may proceed to execute step S103.

To reach a balance between power consumption and display effect, in the disclosed embodiments, the adjustment to the backlight brightness level may only be executed or required when the total area of the white-image areas in a sub-image region reaches a certain value/range. If the total area of the white-image areas in a sub-image region reaches the value/range, the average brightness level L of the sub-image region may be in the preset brightness level range.

The preset brightness level range may be defined as (B, A). That is, the average brightness level L of a sub-image region may be in the brightness level range of (B, A), i.e., B<L<A. L represents the average brightness level of a sub-image region. The first brightness level B represents the lower limit of the brightness level range. The second brightness level A represents the upper limit of the brightness level range. In operation, the LCD may first determine if the average brightness level L of a sub-image region is higher than the first brightness level B, i.e., L>B. If L>B, the LCD may continue to determine if the average brightness level L of the sub-image region is lower than the second brightness level A, i.e., L<A. If the average brightness level of a sub-image region is not in the brightness level range (B, A), the LCD may proceed to execute step S103.

If L≤B, the sub-image region having the average brightness level L may be sufficiently dark and the total area of the continuously arranged white-image areas may be sufficiently small. In this case, the backlight brightness level of the corresponding sub-display region may not need to be adjusted using the disclosed method. Instead, a suitable method/algorithm, e.g., based on the average brightness level of the sub-image region, may be used to adjust the brightness level of the corresponding sub-display region. If L≥A, the sub-image region having the average brightness level L may be sufficiently bright. In this case, no adjustment to the backlight brightness level of the corresponding sub-display region is needed. That is, when L≤B or L≥A, the LCD may not need to be further divided into sub-display regions, and a suitable algorithm may be used to adjust the backlight brightness level of the sub-image region. Specifically, a suitable algorithm based on the average brightness levels of sub-image regions, or any suitable improved algorithms based on the average brightness levels of sub-image regions. Step 102 may exclude the sub-display regions that do not require adjustment to the backlight brightness levels. Accordingly, computation load in steps S1 and S2 may be reduced. If B<L<A, a sub-image region may contain continuously arranged white-image areas. The LCD may determine if adjustment to the backlight brightness level of the sub-display region corresponding to the sub-image region is needed based on the total area of the continuously arranged white-image areas.

In some embodiments, the value of the second brightness level A may be in the range of approximately 0.4≤A≤0.5. The value of the first brightness level B may be in the range of approximately 0.1≤B≤0.2. In some embodiments, the value of the second brightness level A may be sufficiently close to 0.5. If the average brightness level L of a sub-image region is higher than the second brightness level A, the sub-image region may be sufficiently bright and no adjustment to the backlight brightness level is needed. If the average brightness level L of a sub-image region is lower than or equal to the second brightness level A, the LCD may subsequently determine if the average brightness level L is lower than the first brightness level B. The value of the first brightness level B may be sufficiently close to 0.1. When B≤L≤A, the sub-image region corresponding to the average brightness level L may include a large dark-image area and a plurality of small white-image areas. That is, if in step S1, the LCD determines the sub-image region contains a large dark-image area and a plurality of small white-image areas, the LCD may adjust the backlight brightness level of the sub-display region corresponding to the sub-image region to a desired brightness level, e.g., the maximum brightness level. Thus, impaired display effect of the LCD on the continuously arranged small white-image areas, caused by overly low backlight brightness level, may be reduced or prevented.

In step 103, if the brightness level of a sub-image region is not in the brightness level range, the LCD may adjust the backlight brightness level of the sub-display regions using an algorithm based on the average brightness level of the corresponding sub-image region. The algorithm may be predetermined. In step 103, the average brightness level of a sub-image region may be used as a base for the adjustment to the backlight brightness level of the corresponding sub-display region.

Figure 3:
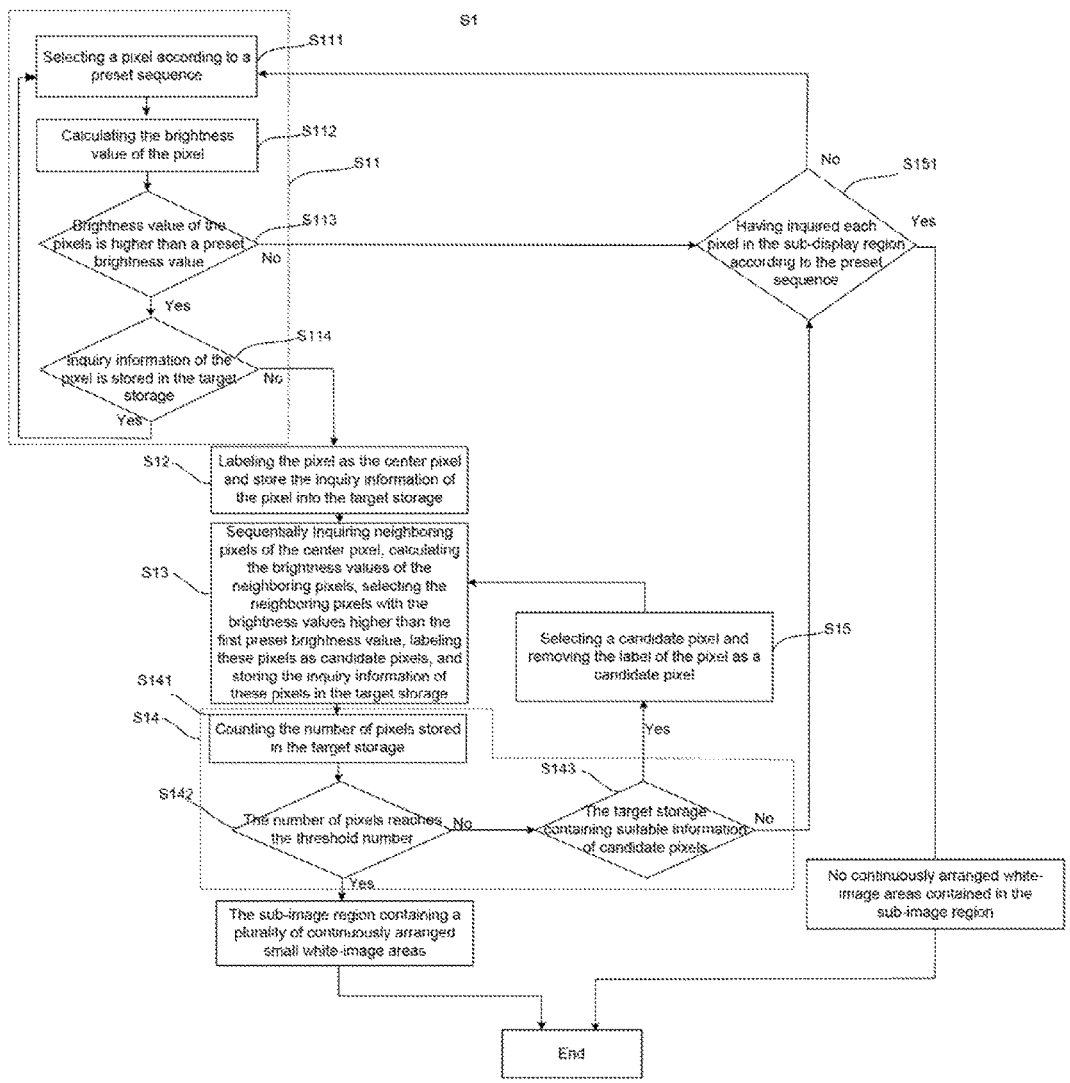
FIG. 3 illustrates an exemplary process flow to implement step S1 in FIG. 2.

FIG. 3 illustrates an exemplary process flow to execute step S1. The process may include steps S11-S16.

In step S11, according to a preset sequence, the LCD may calculate the brightness value of a pixel in a sub-display region, determine if the brightness value of the pixel is higher than a first preset brightness value, and determine if the inquiry information for the pixel is stored in a target storage. The LCD may repeat the operation for each pixel in the sub-display region. In some embodiments, the inquiry information for the pixel may include coordinates data or location data of the pixel.

The preset sequence may be set by the user and/or the manufacturer. Often, the preset sequence may be based on the order the pixel data is entered into the LCD for computation. In one embodiment, the operation on each pixel in a sub-display region may include steps S111-S114.

In step S111, the LCD may select a pixel according to the preset sequence. In step S112, the LCD may calculate the brightness value of the pixel. In step S113, the LCD may determine if the brightness value of the pixel is higher than the first preset brightness value. In step S114, the LCD determine if the inquiry information of the pixel is stored in the target storage. Step S113 may be used to determine if the location of the pixel corresponds to a white-image area. Step S114 may be used to determine if the pixel has been determined to be a pixel with a location corresponding to a white-image area. In some embodiments, the equation to calculate the brightness value of a sequentially-entered pixel may be $Y=0.3RL+0.59GL+0.11BL$. Y represents the brightness value of the pixel. RL, GL, and BL may respectively be the grayscales of red, green, and blue colors of the pixel. The first preset brightness value may be sufficiently close to the maximum brightness value 1. For example, the first preset brightness value may be in the range of approximately 0.8-1.

In some other embodiments, the brightness values of pixels in a sub-display region may be calculated in advance of step S11. In this case, S112 may be omitted, and the LCD may determine if the brightness value of a pixel is higher than the first preset brightness value.

In step S12, if the brightness value of the pixel is higher than the first preset brightness value and the inquiry information of the pixel is not stored in the target storage, the LCD may determine or label the pixel as a center pixel and store the inquiry information of the pixel into the target storage. The target storage may be used to select the inquiry information of the pixels with brightness values higher than the first preset brightness value. The addresses/coordinates of the pixels may be stored in the target storage.

In step S13, the LCD may sequentially inquire neighboring pixels of the center pixel, calculate the brightness values of the neighboring pixels, and select the neighboring pixels with the brightness values higher than the first preset brightness value. The LCD may label the neighboring pixels with the brightness values higher than the first preset brightness value as candidate pixels and store the inquiry information of the candidate pixels in the target storage.

Step S13 may be configured to sequentially inquire neighboring pixels of a pixel of which the brightness value is higher than the first preset brightness value. In some embodiments, the neighboring pixels of a certain pixel may include four pixels adjacent to the pixel, i.e., the four adjacent pixels above, below, on the left side of, and on the right side of the pixel. The coordinates of the neighboring pixels with brightness values higher than the first preset brightness value may be stored in the target storage, and these neighboring pixels may be labeled as candidate pixels.

Step S14 may include steps S141-S143. In step S141, the LCD may count the number of pixels stored in the target storage. In step S142, the LCD may determine if the number of pixels stored in the target storage reaches a threshold number. If the number of stored pixels reaches the threshold number, the LCD may determine the white-image areas in the sub-image region corresponding to the sub-display region meets a preset condition, i.e., a plurality of continuously arranged small white-image areas in the sub-image region, and step S1 may end. If the number of pixels does not reach the threshold number, the LCD may proceed to execute steps S143. In step S143, the LCD may determine if suitable information of candidate pixels, e.g., addresses and/or labels, are stored in the target storage.

Step S14 may be used to obtain the number of pixels stored in the target storage. A larger number of pixels stored in the target storage may represent a larger total area of the white-image areas in the sub-image region. When the number of pixels reaches the threshold number, the total area of the white-image areas may be sufficiently large that adjustment to the backlight brightness level may be needed to ensure desired display effect of the LCD. Further, step S1 may be ended. That is, the process to determine the number of pixels in the sub-display region, corresponding to the white-image areas of the corresponding sub-image region, may be ended. In some embodiments, the threshold number may be determined based on the total number of pixels in the sub-display region. For example, the threshold number may be a certain percentage, e.g., 20%, of the total number of pixels in the sub-display region.

In step S15, if suitable information of candidate pixels is stored in the target storage, the LCD may select one pixel from the candidate pixels as the center pixel, and remove the label of selected pixel as a candidate pixel. The LCD may select the center pixel as the center and proceed to execute step S13. The LCD may search for neighboring pixels of the center pixel. If no suitable information of any candidate pixels is stored in the target storage, the LCD may proceed to step S151 to inquire if the LCD has inquired each pixel in the sub-display region according to the preset sequence. If the inquiry returns a "yes", the LCD may have inquired each pixel in the sub-display region and white-image areas in the sub-image region corresponding to the sub-display region may not meet the preset condition, i.e., no continuously arranged white-image areas are contained in the sub-image region, and step S1 may end. If the inquiry returns a "no", the LCD may proceed to step S11. That is, the LCD may select another pixel, located corresponding to a white-image area and having a brightness value higher than the first preset brightness value, as the center pixel. The LCD may repeat steps S11-S15 until each pixel in the sub-display region has been inquired/searched.

Figure 4:
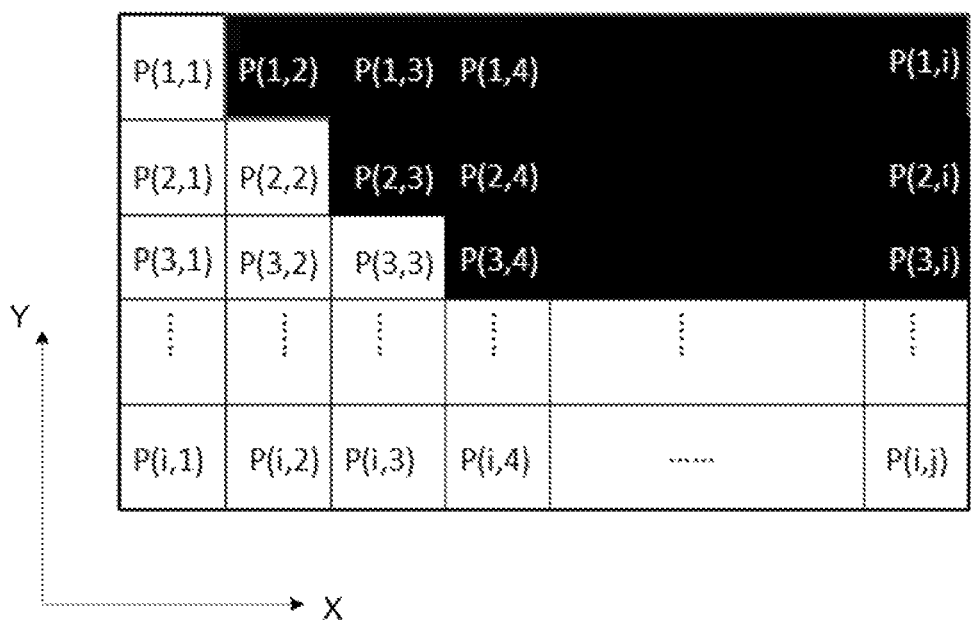
FIG. 4 illustrates an exemplary calculation of a number of neighboring white pixels in sub-display regions of an LCD.
Figure 5:
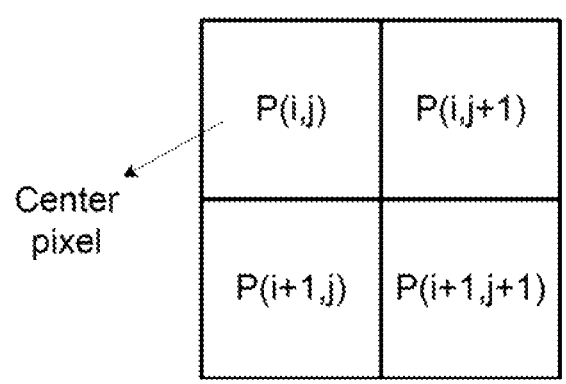
FIG. 5 illustrates exemplary locations a center pixel and corresponding neighboring pixels according to various disclosed embodiments of the present disclosure.

FIG. 4 illustrates an exemplary sub-display region and pixels in the sub-display region. Assuming the brightness value of the pixels in the dark-image area is 0. For example, the brightness values of pixels P(1, 2) and P(1, 3) may be 0. Assuming the brightness value of the pixels in a white-image area is higher than the threshold value, i.e., a first preset brightness value G1. For example, the brightness values of pixels P(1, 1) and P(2, 1) may be higher than the first preset brightness value G1. The target storage may be a suitable FIFO (First In First Out) storage. Coordinates of the pixels, located in the sub-display region and having brightness values higher than the first preset brightness value G1, may be stored in the FIFO storage, as shown in FIG. 5. The LCD may obtain the total number of pixels stored in the FIFO storage and compare the number with the threshold number G2. If the number of pixels stored in the FIFO storage reaches the threshold number G2, the LCD may stop calculating the number of pixels stored in the FIFO storage and start adjusting the backlight brightness levels of the sub-display regions.

To prevent duplicated inquiry information, in some embodiments, when inquiry information of candidate pixels is stored in the target storage in step S13, the coordinates of the center pixel corresponding to a candidate pixel may be contained in the inquiry information of the candidate pixels. Coordinates of interfering pixels may also be included in the inquiry information of the candidate pixels. The interfering pixels may be defined as follows. For one center pixel, a first candidate pixel and a second candidate pixel may be selected from the neighboring pixels. Some pixels may be neighboring pixels of the first candidate pixel and the neighboring pixels of the second candidate pixel. When the first candidate pixel and the second candidate pixel are each used as the center pixel to inquire information of neighboring pixels, the inquiry information of these pixels may be duplicated. These pixels may be defined as the interfering pixels.

Specifically, in step S13, after the pixels with the brightness levels higher than the first preset brightness value G1 are selected and labeled as candidate pixels, the LCD may also determine if interfering pixels exist between candidate pixels. In step S13, when inquiry information of the candidate pixels is being stored in the target storage, the inquiry information of a candidate pixel may include the coordinates of the center pixel and interfering pixels corresponding to the candidate pixel. When proceeding from step S15 to S13, the LCD may not search the center pixel and the interfering pixels corresponding to the candidate pixel.

For example, as shown in FIG. 5, the center pixel is assumed to be P(i,j). When the LCD inquires that the brightness values of pixels P(i,j+1) and P(i+1,j), i.e., the two pixels below and on the right side of the center pixel P(i,j), satisfy the requirements for brightness values, the LCD may determine pixels P(i,j+1) and P(i+1,j) as candidate pixels. When pixels P(i,j+1) and P(i+1,j) are assumed to be center pixels for inquiring other neighboring pixels, because pixel P(i,j) has been inquired, no more inquiry needs to be performed on pixel P(i,j), i.e., the center pixel. Meanwhile, pixel P(i+1,j+1) may be inquired twice, so that pixel P(i+1,j+1) may be referred to as an interfering pixel.

Figure 6:
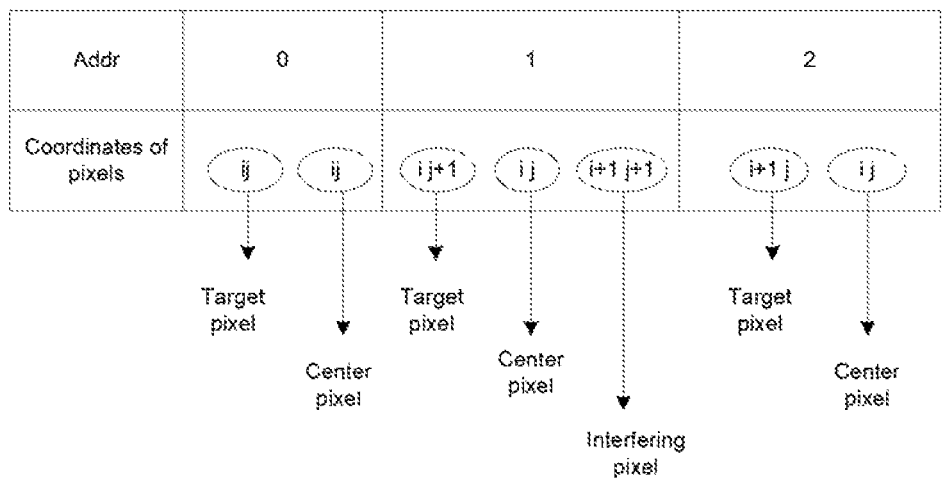
FIG. 6 illustrates storage of certain inquiry information of pixels according to various disclosed embodiments of the present disclosure.

To prevent the described duplicated inquiries on the center pixel and the interfering pixel, e.g., pixels P(i,j) and P(i+1,j+1) shown in FIG. 5, the coordinates of the center pixel and the interfering pixel may be stored in the FIFO storage, so that the center pixel and the interfering pixel do not need to be inquired in future inquiries. An exemplary illustration of an FIFO storage and the pixels stored in the FIFO storage is shown in FIG. 6. When searching for target pixels neighboring the pixel P(i,j+1), based on the coordinates data stored in the FIFO storage, the LCD would not inquire the center pixel, i.e., pixel P(i,j), and the interfering pixel P(i+1,j+1) of the pixel P(i,j+1). A target pixel may be a pixel with the brightness value higher than the first preset brightness value G1.

For example, as shown in FIG. 6, because the brightness values of pixels P(i,j), P(i,j+1), and P(i+1,j) may be higher than the first preset brightness value G1, and the coordinates of the pixels P(i,j), P(i,j+1), and P(i+1,j) may be stored in the FIFO storage, each given a different address, e.g., addresses 0-2. Pixels P(i,j), P(i,j+1), and P(i+1,j) may be regarded as target pixels. Meanwhile, the coordinates of the center pixel P(i,j) may also be stored in each of the three addresses. The coordinates of the interfering pixel P(i+1,j+1) may be stored in the address 1, where the coordinates of the target pixel P(i,j+1) is stored. Thus, in operation, the LCD may sequentially inquire the pixels based on the address data stored in the FIFO storage, starting from address 0. When the target pixel and the center pixel are pixel P(i,j), the LCD may inquire the pixels neighboring the center pixel P(i,j). Further, when the target pixel is pixel P(i,j+1), the center pixel is pixel P(i,j), and the interfering pixel is P(i+1 j+1), the LCD may inquire pixels neighboring pixel P(i,j+1) except for pixels P(i,j) and P(i+1,j+1). Further, when the target pixel is pixel P(i+1,j) and the center pixel is pixel P(i,j), the LCD may inquire pixels neighboring pixel P(i+1,j) except for pixels P(i,j). Thus, the inquiries on center pixel P(i,j) and the interfering pixel P(i+1 j+1) may not be duplicated. For illustrative purposes, in FIGS. 6-8, letters in a circle are used to represent the coordinates of the corresponding pixels.

It should be noted that, the addresses and the coordinates used in the present disclosure are only exemplary. The specific addresses and coordinates in operation may be subjected to different applications and/or designs and should not be limited by the embodiments of the present disclosure.

Referring to FIG. 4, a plurality of pixels may be arranged in an array. The neighboring pixels of a center pixel may be defined as the pixels adjacent to the center pixel, i.e., the pixels above, below, on the right side of, and the on the left side of the center pixel. As shown in FIG. 4, a process to determine if an interfering pixel exists between candidate pixels may be described as follows.

Based on the coordinates of the candidate pixels and the center pixel, the LCD may determine the locations of the candidate pixels with respect to the center pixel. For two candidate pixels, if one candidate pixel is located above the center pixel and the other candidate pixel is located on the left side of the center pixel, an interfering pixel may exist between these two candidate pixels. The coordinates of the interfering pixel may be determined based on the coordinates of these two candidate pixels. For example, for the interfering pixel, the X coordinate may be the smaller one of the X coordinates of the two candidate pixels, and the Y coordinate may be the smaller one of the Y coordinates of the two candidate pixels.

For two candidate pixels, if one candidate pixel is located above the center pixel and the other candidate pixel is located on the right side of the center pixel, an interfering pixel may exist between these two candidate pixels. For the interfering pixel, the X coordinate may be the smaller one of the X coordinates of the two candidate pixels, and the Y coordinate may be the greater one of the Y coordinates of the two candidate pixels.

For two candidate pixels, if one candidate pixel is located below the center pixel and the other candidate pixel is located on the left side of the center pixel, an interfering pixel may exist between these two candidate pixels. For the interfering pixel, the X coordinate may be the greater one of the X coordinates of the two candidate pixels, and the Y coordinate may be the smaller one of the Y coordinates of the two candidate pixels.

For two candidate pixels, if one candidate pixel is located below the center pixel and the other candidate pixel is located on the right side of the center pixel, an interfering pixel may exist between these two candidate pixels. For the interfering pixel, the X coordinate may be the greater one of the X coordinates of the two candidate pixels, and the Y coordinate may be the greater one of the Y coordinates of the two candidate pixels.

In some embodiments, four storage units, e.g., four registers, may be included in the FIFO storage. The illustrative purposes, the four storage units may be referred as the upper storage unit, the lower storage unit, the left storage unit, and the right storage unit. The four storage units may correspond to the four pixels located above, below, on the left side of, and on the right side of the center pixel. Based on the coordinates of the candidate pixels and the center pixel, the LCD may determine the locations of the candidate pixels with respect to the center pixel, and store the coordinates of the candidate pixels into corresponding storage units. For example, if the LCD detects the brightness values of the pixels above and on the right side of the center pixel satisfy the requirements for brightness values, the pixels above and on the right side of the center pixel may be stored into the corresponding storage units. For example, the coordinates of the pixel above the center pixel may be stored into the upper storage unit, and the coordinates of the pixel on the right side of the center pixel may be stored into the right storage unit.

Further, the LCD may inquire the upper storage unit, the lower storage unit, the left storage unit, and the right storage unit to obtain the locations of any two candidate pixels with respect to the center pixel. The LCD may determine if an interfering pixel exists between two candidate pixels. The LCD may also determine the coordinates of the interfering pixels. For example, the LCD may inquire the coordinates stored in the upper storage unit and the right storage unit and determine an interfering pixel exists between two corresponding candidate pixels, i.e., the pixel above the center pixel and the pixel on the right of the center pixel. The X coordinate of the interfering pixel may be the smaller one of the X coordinates of the two candidate pixels, and the Y coordinate of the interfering pixel may be the greater one of the Y coordinates of the two candidate pixels.

The disclosed method for adjusting backlight brightness levels may be described in detail. As shown in FIG. 4, the LCD may sequentially determine a first center pixel P(1,1) and store the location/coordinates data of pixel P(1,1) into the FIFO storage. The LCD may further start to determine if any target pixels are neighboring the first center pixel P(1,1).

Figure 7:
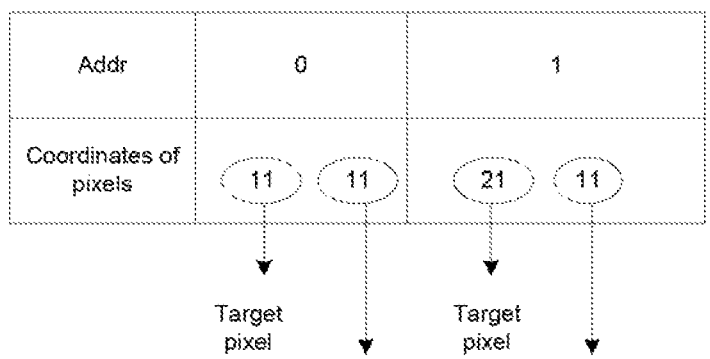
FIG. 7 illustrates storage of certain inquiry information of pixels according to various disclosed embodiments of the present disclosure.

As shown in FIG. 4, the two pixels being neighboring and adjacent to pixel P(1,1) may be pixels P(1,2) and P(2, 1). According to previous assumption, only the brightness value of pixel P(2,1) may satisfy the requirements for brightness values, and pixels P(2,1) may be an candidate pixel. The coordinates of pixel P(2,1) and the corresponding center pixel P(1,1) may be sequentially stored into the FIFO storage, as shown in FIG. 7. Further, the LCD may access and read out the inquiry information of the candidate pixels, stored in address 1, of [(21),(11)]. The LCD may further determine if any target pixels, satisfying the requirements for brightness values, are neighboring pixel P(2,1).

According to above descriptions, the center pixel of pixel P(2,1) may be pixel P(1,1). When the LCD assumes pixel P(2,1) as the center pixel and inquires neighboring pixels of center pixel P(2,1), the LCD may not inquire the center pixel P(1,1) of pixel P(2,1). That is, the LCD may only need to determine if the pixel P(2,2) on the right side of pixel P(2,1) and pixel P(3,1) below pixel P(2,1) satisfy requirements for brightness values.

According to previous assumption, pixels P(2,2) and P(3,1) may both satisfy requirements for brightness values and may be assumed to be target pixels. The absolute difference between the X coordinate and the Y coordinate of each of pixels P(2,2) and P(3,1) may both be 1. The LCD may determine the an interfering pixel may be between pixels P(2,2) and P(3,1). Further, based on the coordinates of pixels P(2,2), P(3,1), and center pixel P(2,1), the coordinates of the interfering pixel may be determined. That is, the X coordinate of the interfering pixel may be the greater one of the X coordinates of pixels P(2,2) and P(3,1), and the Y coordinate may be the greater one of the Y coordinates of pixels P(2,2) and P(3,1). The coordinates of the interfering pixel may be (3,2). The LCD may store proper data, e.g., coordinates, of pixel P(3,2) in the storage unit. The storage unit for storing pixel P(3,2) may be the storage unit used for storing the data for pixel P(2,2) or the storage unit used for storing the data for pixel P(3,1).

Figure 8:
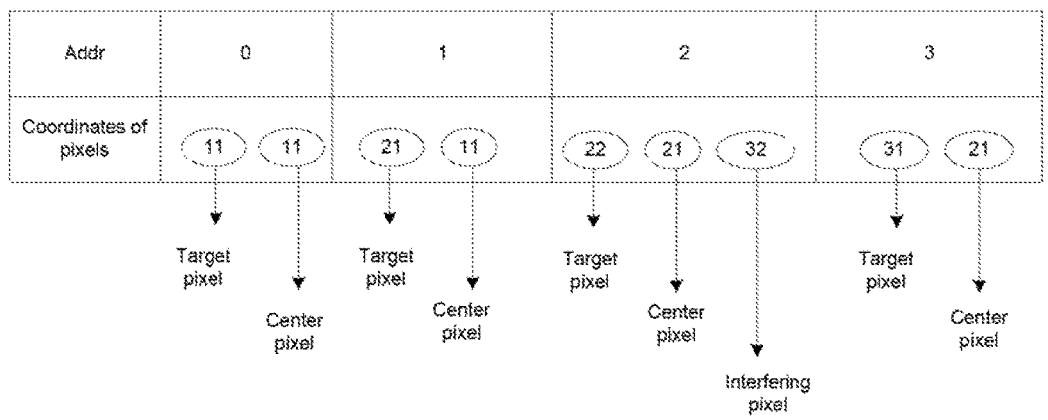
FIG. 8 illustrates storage of certain inquiry information of pixels according to various disclosed embodiments of the present disclosure.

As shown in FIG. 8, the LCD may further access address 2 in the FIFO storage and read out the inquiry information of pixel P(2,2), which may be [(22)(21)(32)]. The LCD may determine if target pixels, satisfying the requirements for brightness values, may be neighboring pixel P(2,2). According to previous definition, the center pixel of pixel P(2,2) may be pixel P(2,1), and the interfering pixel may be pixel P(3,2). Thus, when inquiring neighboring pixels of pixel P(2,2), pixels P(2, 1) and P(3,2) may not be inquired. The LCD may only determine if the pixels above and on the right side of pixel P(2,2) may satisfy the requirements for brightness values.

Although pixel P(1,2) has been inquired once, to reduce the complexity level of pixel inquiry design, non-target pixels may be inquired repeatedly. According to the assumption described above, the brightness value of pixel P(1,2) does not satisfy the requirements for brightness values and pixel P(1,2) may be a non-target pixel. Thus, information of pixel P(1,2) may not be stored into the FIFO storage. The LCD may repeat the steps described above. For example, the LCD may access the FIFO storage and read out the coordinates of the target pixel stored in address 3. The LCD may determine if any other target pixels are neighboring the target pixel. The LCD may store the coordinates of other detected target pixels into the FIFO storage. When the number of pixels stored in the FIFO reaches the threshold number G2, the inquiry of the sub-display region may be completed and the LCD may adjust the backlight brightness level of the sub-display region accordingly. If after inquiring the entire sub-display region, and the number of pixels stored in the FIFO storage does not reach the threshold number G2, the LCD may adjust the backlight brightness level of the sub-display region using a suitable algorithm based on the average brightness level of the sub-display region.

The present disclosure provides a method for adjusting a backlight brightness level. By using the disclosed method, when a sub-display region contains a large dark-image area and a plurality of small white-image areas, the LCD may increase the backlight brightness level of the sub-display region. Impaired display effect and decrease in contrast level may be prevented or reduced. The display effect of the LCD may be improved.

Figure 9:
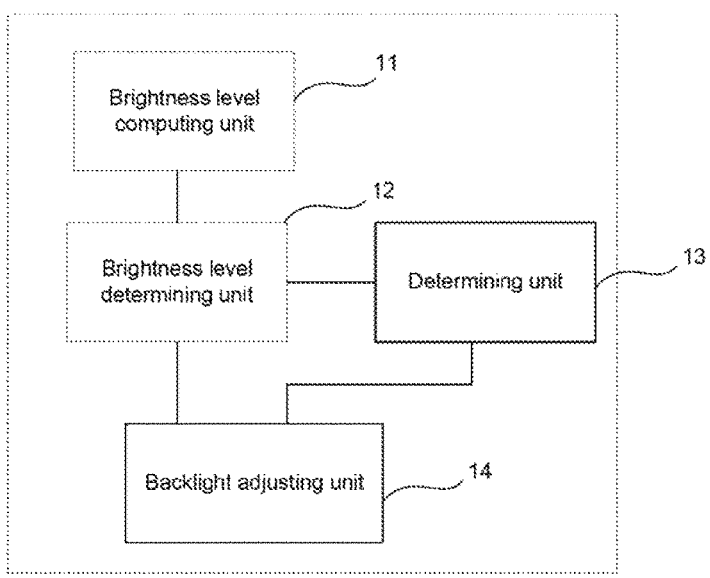
FIG. 9 illustrates an exemplary backlight adjusting device according to various disclosed embodiments of the present disclosure.

Embodiments of the present disclosure further provide a backlight adjusting device. FIG. 9 illustrates an exemplary structure of the backlight adjusting device. The backlight adjusting device may include a brightness level computing unit 11, a brightness level determining unit 12, a determining unit 13, and a backlight adjusting unit 14. The determining unit 13 may be used to determine if the white-image areas in a sub-image region satisfy a preset condition. Each sub-image region may correspond to a sub-display region, and each sub-display region may correspond to a backlight-adjustable region. If the white-image areas in the sub-display region satisfies the preset condition, the backlight adjusting unit 14 may increase the backlight brightness level of the sub-display region. Accordingly, decrease in contrast level and impaired display effect, caused by small white-image areas in the image displayed by the LCD, may be improved. The display effect of the LCD may be improved.

The backlight adjusting device may further include a brightness level computing unit 11. Before the LCD determines whether the white-image areas satisfy the preset condition, the brightness level computing unit 11 may calculate the average brightness level of the sub-image region displayed by each sub-display region. The backlight adjusting device may further include a brightness level determining unit 12. The brightness level determining unit 12 may determine if the average brightness level of each sub-display region reaches a preset brightness level range. For sub-display regions with brightness levels not reaching the brightness level range, the backlight adjusting unit 14 may adjust the backlight brightness levels of these sub-display regions using a suitable algorithm based on the average brightness levels of the sub-display regions.

The backlight adjusting unit 14 may also be used to adjust the backlight brightness level of a sub-display region using a suitable algorithm based on the average brightness level of the sub-display region, when the white-image areas do not satisfy the preset condition. In one embodiment, the suitable algorithm may be a preset algorithm or computer program.

That is, the disclosed backlight adjusting device may adjust the backlight brightness levels of the sub-display regions based on the average brightness levels of the sub-display regions. The backlight adjusting unit 14 may increase the backlight brightness level of a sub-display region only when the determining unit 13 detects a plurality of white-image areas in the sub-display region, with decreased contrast level and impaired display effect of the LCD. Thus, contrast level and display effect of the LCD may be prevented from being reduced. The display effect of the LCD may be improved.

The determining unit 13 may include a first computing module. The first computing module may calculate the brightness value of each pixel in a sub-display region according to a preset sequence. The first computing module may also compare the brightness value of each pixel to a first preset brightness value.

The determining unit 13 may also include a first determining module. The first determining module may determine if the brightness value of a pixel is higher than the first preset brightness value and if the inquiry information of the pixel is stored in the target storage. The inquiry information may include coordinates data of the pixel. The determining unit 13 may also include a labeling module. The labeling module may label a pixel as a center pixel when the brightness value of the pixel is higher than the first preset brightness value and the inquiry information of the pixel is not stored in the target storage.

The determining unit 13 may further include a storage module. The storage module may be used to store the inquiry information of center pixels.

The determining unit 13 may further include an inquiring module. The inquiring module may sequentially inquire neighboring pixels of a center pixel.

The determining unit 13 may further include a selecting module. The selecting module may be used to calculate the brightness values of the neighboring pixels and select pixels with brightness values higher than the first preset brightness value. The labeling module may also be used to label the selected pixels, with brightness values higher than the first preset brightness value, as candidate pixels. The storage module may also be used to store the inquiry information of the candidate pixels.

The determining unit 13 may further include a counting module. The counting module may be used to count the number of pixels stored in the target storage.

The determining unit 13 may further include a second determining unit. The second determining unit may be used to determine if the number of pixels stored in the target storage reaches the threshold number.

The determining unit 13 may further include a terminating module. The terminating module may terminate the determining operation for the sub-display region when the second determining module determines the number of pixels stored in the target storage reaches the threshold number.

The determining unit 13 may further include a third determining module. The third determining module may be used to determine if candidate pixels are stored in the target storage when the number of pixels stored in the target storage does not reach the threshold value.

The determining unit 13 may further include a decision-making module. The decision-making module may select one of the candidate pixels as a center pixel when the third determining module determines candidate pixels are stored in the target storage. The labeling module may also remove the label of being a candidate pixel from the pixel selected by the selecting module.

The determining unit 13 may further include a fourth determining module. The fourth determining module may continue to determine if the first computing module has inquired each pixel in the sub-display region when the third determining module determines no candidate pixels in the target storage. The terminating module may return a message indicating the white-image areas in the sub-image region does not satisfy the preset condition when the fourth determining module determines each pixel in the sub-display region has been inquired. Further, the terminating module may terminate the determining operation on the sub-display region.

The determining unit 13 may also include a fifth determining module. The fifth determining module may be used to determine if an interfering pixel exists between two candidate pixels. The inquiry information of a candidate pixel may further include the coordinates of the center pixel corresponding to the candidate pixel, and the coordinates of the interfering pixel corresponding to the candidate pixel. When the inquiring module sequentially inquires neighboring pixels of the center pixel, the inquiring module may not inquire the center pixel and the interfering pixel stored in the inquiry information of the candidate pixel.

The neighboring pixels of a center pixel may be located adjacent to the center pixel and may be located above, below, on the right side of, and on the left side of the center pixel. The fifth determining module may include a location-determining sub-module. The location-determining sub-module may be used to determine the location of each candidate pixel with respect to the corresponding center pixel based on the coordinates of the candidate pixel and the center pixel. The fifth determining module may further include an interfering-pixel coordinate-determining sub-module. The interfering-pixel coordinate-determining sub-module may be used to determine an interfering pixel and the coordinates of the interfering pixel. For example, if one candidate pixel is located above the center pixel and another candidate pixel is located on the left side of the center pixel, the interfering-pixel coordinate-determining sub-module may determine an interfering pixel exists between the two candidate pixels. The interfering-pixel coordinate-determining sub-module may also determine the X coordinate of the interfering pixel to be the smaller one of the X coordinates of the two candidate pixels, and the interfering-pixel coordinate-determining sub-module may also determine the Y coordinate of the interfering pixel to be the smaller one of the Y coordinates of the two candidate pixels.

If one candidate pixel is located above the center pixel and another candidate pixel is located on the right side of the center pixel, the interfering-pixel coordinate-determining sub-module may determine an interfering pixel exists between the two candidate pixels. The interfering-pixel coordinate-determining sub-module may also determine the X coordinate of the interfering pixel to be the smaller one of the X coordinates of the two candidate pixels, and the interfering-pixel coordinate-determining sub-module may also determine the Y coordinate of the interfering pixel to be the greater one of the Y coordinates of the two candidate pixels. If one candidate pixel is located below the center pixel and another candidate pixel is located on the left side of the center pixel, the interfering-pixel coordinate-determining sub-module may determine an interfering pixel exists between the two candidate pixels. The interfering-pixel coordinate-determining sub-module may also determine the X coordinate of the interfering pixel to be the greater one of the X coordinates of the two candidate pixels, and the interfering-pixel coordinate-determining sub-module may also determine the Y coordinate of the interfering pixel to be the smaller one of the Y coordinates of the two candidate pixels. If one candidate pixel is located below the center pixel and another candidate pixel is located on the right side of the center pixel, the interfering-pixel coordinate-determining sub-module may determine an interfering pixel exists between the two candidate pixels. The interfering-pixel coordinate-determining sub-module may also determine the X coordinate of the interfering pixel to be the greater one of the X coordinates of the two candidate pixels, and the interfering-pixel coordinate-determining sub-module may also determine the Y coordinate of the interfering pixel to be the greater one of the Y coordinates of the two candidate pixels.

The disclosed backlight adjusting device may implement dynamic adjustment to the backlight of the LCD. Decrease in contrast level and display effect, caused by a plurality of small white-image areas in the images to be displayed by the LCD, may be prevented.

It should be noted that, the specific ways to implement the functions of the units and the modules described above should not be limited by the embodiments of the present disclosure. Any suitable software and/or hardware, e.g., computer programs and/or circuitry, may be used to implement the functions of the disclosed units and modules in the backlight adjusting device.

Figure 10:
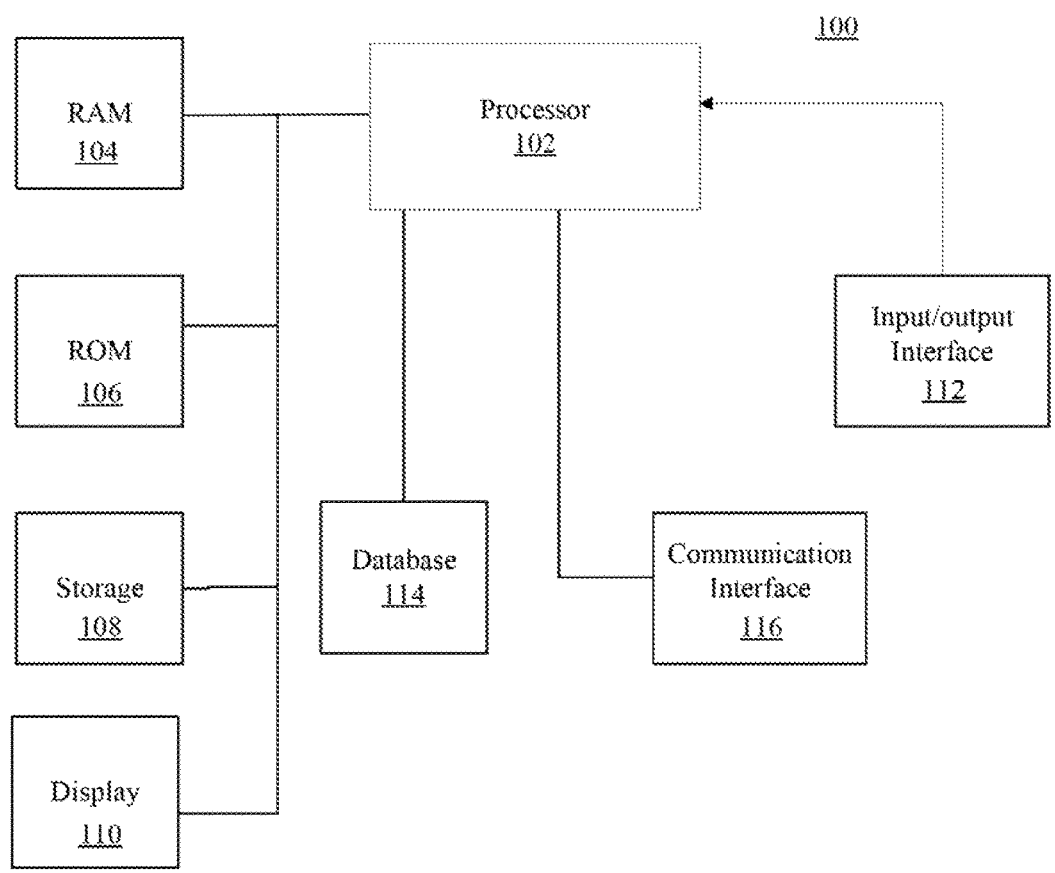
FIG. 10 illustrates an exemplary structure of a controller used in various disclosed embodiments of the present disclosure.

The operation of the disclosed backlight adjusting device may be controlled by a controller. The units and modules described above in relation to FIG. 9 may be implemented through suitable parts in the controller. FIG. 10 illustrates an exemplary structure of a controller 100.

The controller 100 may receive, process, and execute commands from the LCD or the user. The controller 100 may include any appropriately configured computer system. As shown in FIG. 10, the controller 100 may include a processor 102, a random access memory (RAM) 104, a read-only memory (ROM) 106, a storage 108, a display 110, an input/output interface 112, a database 114; and a communication interface 116. Other components may be added and certain devices may be removed without departing from the principles of the disclosed embodiments.

Processor 102 may include any appropriate type of general purpose microprocessor, digital signal processor or microcontroller, and application specific integrated circuit (ASIC). Processor 102 may execute sequences of computer program instructions to perform various processes associated with controller 100. Computer program instructions may be loaded into RAM 104 for execution by processor 102 from read-only memory 106, or from storage 108. Storage 108 may include any appropriate type of mass storage provided to store any type of information that processor 102 may need to perform the processes. For example, storage 108 may include one or more hard disk devices, optical disk devices, flash disks, or other storage devices to provide storage space.

Display 110 may provide information to a user or users of the controller 100. Display 110 may include any appropriate type of computer display device or electronic device display (e.g., CRT or LCD based devices). Input/output interface 112 may be provided for users to input information into controller 100 or for the users to receive information from controller 100. For example, input/output interface 112 may include any appropriate input device, such as a keyboard, a mouse, an electronic tablet, voice communication devices, touch screens, or any other optical or wireless input devices. Further, input/output interface 112 may receive from and/or send to other external devices.

Further, database 114 may include any type of commercial or customized database, and may also include analysis tools for analyzing the information in the databases. Database 114 may be used for storing proper information for the operation of the backlight adjusting device, e.g., adjusting the backlight brightness level. Communication interface 116 may provide communication connections such that controller 100 may be accessed remotely and/or communicate with other systems through computer networks or other communication networks via various communication protocols, such as transmission control protocol/internet protocol (TCP/IP), hyper text transfer protocol (HTTP), etc.

In one embodiment, a user or another computer may input commands on the input/output interface 112 to start adjusting the backlight brightness levels of the sub-display regions of the LCD. The processor 102 may receive the commands and execute operations, e.g., the determining processes, based on the brightness level ranges stored in the storage 108 and the pixel data stored in the database 114. Suitable data may be stored in ROM 106 and storage 108 to be processed. After the data is processed, result of the backlight adjustment can be obtained. The result can be returned to the user via the display 110 or the input/output interface 112.

For example, in some embodiments, a field-programmable gate array (FPGA) chip may be used to implement the functions of the determining unit 13; and a pulse width modulation (PWM) circuit may be used to implement functions of the backlight adjusting unit 14. PWM is an analog control and width modulation of squared pulses. PWM utilizes the digital output of a microprocessor to effectively control an analog circuit.

The present disclosure further provides a display device. The display device may include one or more of the disclosed backlight adjusting device. The disclosed display device may have improved contrast level. The display effect of the LCD may have improved stability. In addition, the power consumption of the LCD may be reduced. The display device may be an LCD panel, an electronic paper, a mobile phone, a tablet computer, a television, a monitor, a laptop, a digital photo frame, a navigation device, and any other suitable devices and products that require backlight.

In the present disclosure, terms of "first", "second", and the alike are merely used to distinguish different objects and do not indicate any differences in functions and/or structures of the objects. The embodiments exemplified using these terms are only for illustrative purposes. Any obvious variation and/or extension of the present disclosure are within the scope of the present disclosure.

It should be understood by those skilled in the art that, at least part of the disclosed method is implemented using computer programs in combination with corresponding hardware. The programs may be stored in a readable storage medium. The programs may be executed to implement the embodiments of the present disclosure. The readable storage medium may include a floppy disk, an optical disk, a read-only memory (ROM), a random access memory (RAM), and other suitable storage.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for adjusting backlight brightness levels of a display, a display region of the display being divided into a plurality of sub-display regions, each sub-display region displaying a sub-image region of a to-be-displayed image, a backlight brightness level of a sub-display region being adjustable, comprising:
    determining if white-image areas in a sub-image region satisfies a preset condition, including:
        selecting a pixel according to a preset sequence;
        calculating a brightness value of the pixel;
        determining if the brightness value of the pixel is higher than a first preset brightness value;
        determining if an inquiry information for the pixel is stored in a target storage, the inquiry information for the pixel comprising coordinates data of the pixel;
        if the brightness value of the pixel is higher than the first preset brightness value and the inquiry information of the pixel is not stored in the target storage, labeling the pixel as a center pixel and storing the inquiry information of the pixel into the target storage;
        sequentially inquiring neighboring pixels of the center pixel;
        calculating brightness values of the neighboring pixels;
        selecting the neighboring pixels with the brightness values higher than the first preset brightness value, labeling the neighboring pixels with the brightness values higher than the first preset brightness value as candidate pixels, and storing inquiry information of the candidate pixels in the target storage; and
        determining a number of pixels stored in the target storage; and
    increasing the backlight brightness level of a sub-display region corresponding to the sub-image region if the white-image areas satisfy the preset condition.

2. The method according to claim 1, further comprising: determining the white-image area in the sub-image region meets the preset condition if the number of pixels stored in the target storage reaches a threshold number.

3. The method according to claim 1, further comprising: determining whether candidate pixels are stored in the target storage if the number of pixels is fewer than the threshold number.

4. The method according to claim 3, further comprising: if candidate pixels are stored in the target storage, selecting one pixel from the candidate pixels as the center pixel, and removing a label of the selected pixel as a candidate pixel.

5. The method according to claim 3, further comprising: determining whether each pixel in the sub-display region has been inquired if no candidate pixels are stored in the target storage.

6. The method according to claim 5, further comprising:
    determining the white-image area in the sub-image region fails to meet the preset condition if each pixel in the sub-display region has been inquired; and
    returning to calculating a brightness value of a pixel in a sub-display region according to the preset sequence if not all pixels in the sub-display region have been inquired.

7. The method according to claim 1, further comprising: determining whether an interfering pixel exists between candidate pixels after labeling the neighboring pixels with the brightness values higher than the first preset brightness value as candidate pixels.

8. The method according to claim 7, wherein coordinate data of the interfering pixel is stored in a same address with a corresponding candidate pixel in the target storage, and coordinate data of the center pixel is stored in an address of each candidate pixel in the target storage.

9. The method according to claim 8, wherein the neighboring pixels are adjacent to and are above, below, on the left side, and on the right side of the center pixel, and determining the interfering pixel comprises: based on the coordinate data of candidate pixels and corresponding center pixel, determining locations of the candidate pixels with respect to the center pixel.

10. The method according to claim 9, wherein for two candidate pixels,
    if one candidate pixel is located above the center pixel and another candidate pixel is located on the left side of the center pixel, an interfering pixel exists between the two candidate pixels, an X coordinate of the interfering pixel being a smaller one of X coordinates of the two candidate pixels, and a Y coordinate of the interfering pixel being a smaller one of Y coordinates of the two candidate pixels;
    if one candidate pixel is located above the center pixel and the other candidate pixel is located on the right side of the center pixel, an interfering pixel exists between the two candidate pixels, the X coordinate of the interfering pixel being the smaller one of the X coordinates of the two candidate pixels, and the Y coordinate of the interfering pixel being a greater one of the Y coordinates of the two candidate pixels;
    if one candidate pixel is located below the center pixel and the other candidate pixel is located on the left side of the center pixel, an interfering pixel exists between the two candidate pixels, the X coordinate of the interfering pixel being a greater one of the X coordinates of the two candidate pixels, and the Y coordinate of the interfering pixel being the smaller one of the Y coordinates of the two candidate pixels; and
    if one candidate pixel is located below the center pixel and the other candidate pixel is located on the right side of the center pixel, an interfering pixel exists between the two candidate pixels, the X coordinate of the interfering pixel being the greater one of the X coordinates of the two candidate pixels, and the Y coordinate being the greater one of the Y coordinates of the two candidate pixels.

11. The method according to claim 1, further comprising:
calculating an average brightness level of the sub-image region; and
determining if the average brightness level falls in a preset brightness level range.

12. The method according to claim 11, further comprising:
determining whether white-image areas in a sub-image region satisfy the preset condition if the average brightness level falls in the preset brightness level range; and
increasing the backlight brightness level of a sub-display region corresponding to the sub-image region if the white-image areas satisfy the preset condition.

13. The method according to claim 11, further comprising: adjusting the backlight brightness level of the sub-display region based on the average brightness level of the sub-display region if the average brightness level falls out of the preset brightness level range.

14. The method according to claim 11, wherein the preset brightness level range is between a first brightness value and a second brightness value, the first brightness value being approximately between 0.4 and 0.5, and the second brightness value being approximately between 0.1 and 0.2.

15. The method according to claim 1, wherein if inquiry information of the pixel is stored in the target storage, the display returns to selecting each pixel according to the preset sequence.

16. The method according to claim 1, further comprising: adjusting the backlight brightness level of the sub-display region based on an average brightness level of the sub-display region if the white-image areas in the sub-display region fails to satisfy the preset condition.

17. The method according to claim 1, wherein the preset sequence is based on an order pixel data is entered for computation.

18. The method according to claim 1, wherein the preset condition is a plurality of white-image areas continuously arranged in a sub-image region.

19. A backlight adjusting device, comprising a determining unit and a backlight adjusting unit, wherein:
the determining unit is configured to determine if white-image areas in a sub-image region satisfy a preset condition, wherein the determining unit further includes:
a first computing module configured to calculate a brightness value of each pixel in a sub-display region according to a preset sequence and compare the brightness value of each pixel to a first preset brightness value;
a first determining module configured to determine if the brightness value of a pixel is higher than the first preset brightness value and if inquiry information of the pixel is stored in the target storage, the inquiry information comprising coordinate data of the pixel;
an inquiring module configured to sequentially inquire neighboring pixels of a center pixel;
a selecting module configured to calculate brightness values of the neighboring pixels, select pixels with brightness values higher than the first preset brightness value, and label the selected pixels as candidate pixels;
a counting module configured to count a number of pixels stored in the target storage;
a second determining unit configured to determine if the number of pixels stored in the target storage reaches a threshold number;
a third determining module configured to determine if candidate pixels are stored in the target storage when the number of pixels stored in the target storage is less than the threshold value;
a decision-making module configured to select one of the candidate pixels as a center pixel when the candidate pixels are stored in the target storage;
a fourth determining module configured to continue to determine if the first computing module has inquired each pixel in the sub-display region when the no candidate pixels are stored in the target storage;
a labeling module configured to label a pixel as a center pixel when the brightness value of the pixel is higher than the first preset brightness value and the inquiry information of the pixel is not stored in the target storage, and remove the label of being a candidate pixel from the pixel selected by the selecting module;
a storage module configured to store inquiry information of a center pixel and store the inquiry information of the candidate pixels; and
a terminating module configured to terminate a determining operation for the sub-display region when the number of pixels stored in the target storage reaches the threshold number, return a message indicating the white-image areas in the sub-image region fails to satisfy the preset condition when each pixel in the sub-display region has been inquired, and terminate a determining operation on the sub-display region; and
the backlight adjusting unit is configured to increase a backlight brightness level of the sub-display region if the white-image areas in the sub-display region satisfies the preset condition.

20. The backlight adjusting device according to claim 19, the determining unit further comprising a fifth determining module configured to determine if an interfering pixel exists between two candidate pixels.

21. The backlight adjusting device according to claim 19, wherein the fifth determining module comprises:
a location-determining sub-module configured to determine a location of each candidate pixel with respect to a corresponding center pixel based on the coordinate data of the candidate pixel and the center pixel; and
an interfering-pixel coordinate-determining sub-module configured to determine if an interfering pixel exists and coordinate data of the interfering pixel.

22. The backlight adjusting device according to claim 19, wherein the backlight adjusting unit is configured to adjust the backlight brightness level of the sub-display region if the white-image areas in the sub-display region fails to satisfy the preset condition.

23. The backlight adjusting device according to claim 19, wherein the preset condition is a plurality of white-image areas continuously arranged in a sub-image region.

24. A display device, comprising one or more of the backlight adjusting devices according to claim 19.

25. A method for adjusting backlight brightness levels of a display, a display region of the display being divided into a plurality of sub-display regions, each sub-display region displaying a sub-image region of a to-be-displayed image, a backlight brightness level of a sub-display region being adjustable, comprising:
determining if white-image areas in a sub-image region satisfies a preset condition;

increasing the backlight brightness level of a sub-display region corresponding to the sub-image region if the white-image areas satisfy the preset condition; and adjusting the backlight brightness level of the sub-display region based on an average brightness level of the sub-display region if the white-image areas in the sub-display region fails to satisfy the preset condition.

* * * * *